Feb. 23, 1965 L. A. MOREHEAD 3,171,012
AUTOMATIC GROOVE FOLLOWER FOR WELDING APPARATUS
Filed March 26, 1962 4 Sheets-Sheet 1

INVENTOR.
LAUREL A. MOREHEAD
BY
Meyers & Peterson
ATTORNEYS

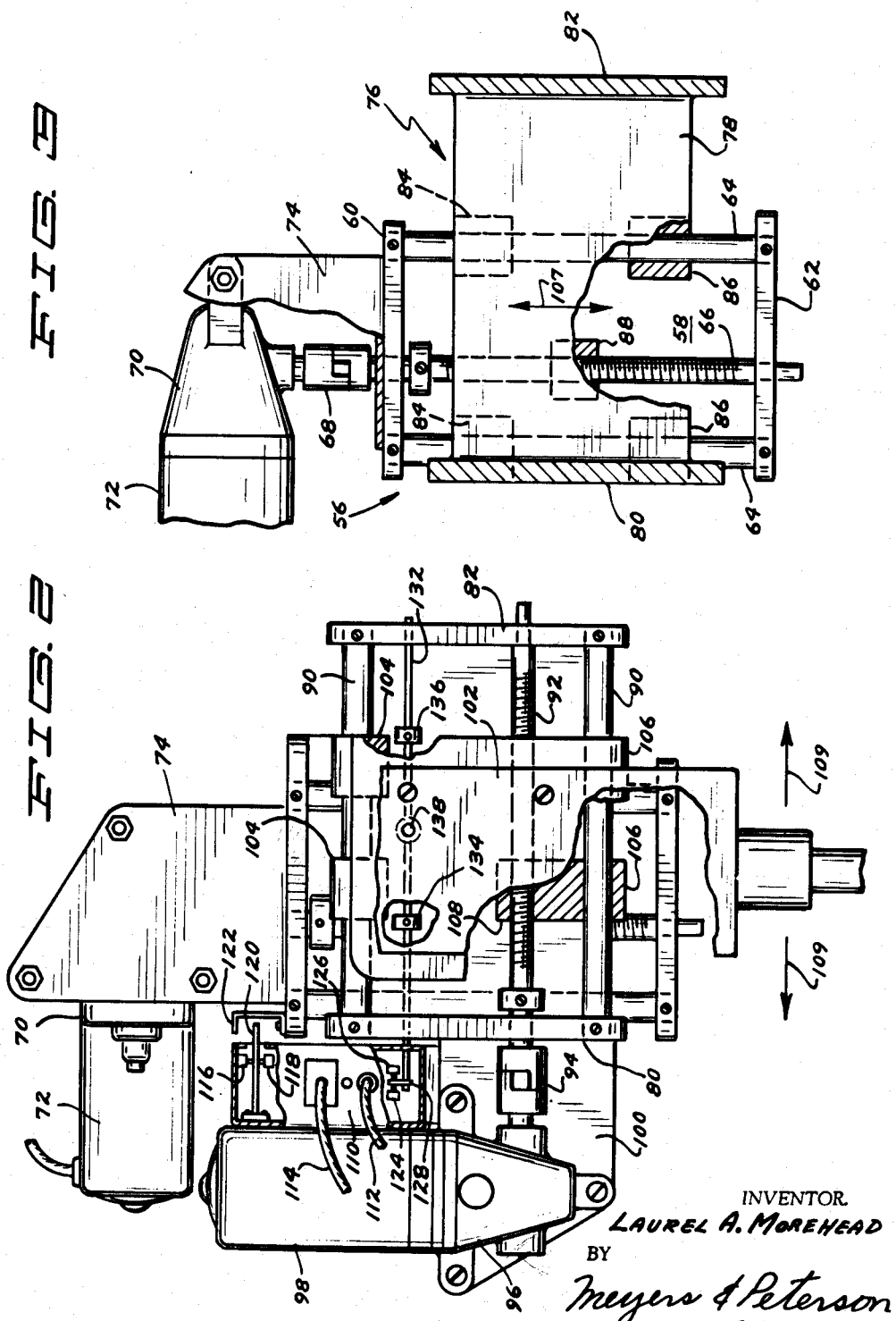

Feb. 23, 1965   L. A. MOREHEAD   3,171,012
AUTOMATIC GROOVE FOLLOWER FOR WELDING APPARATUS
Filed March 26, 1962   4 Sheets-Sheet 3
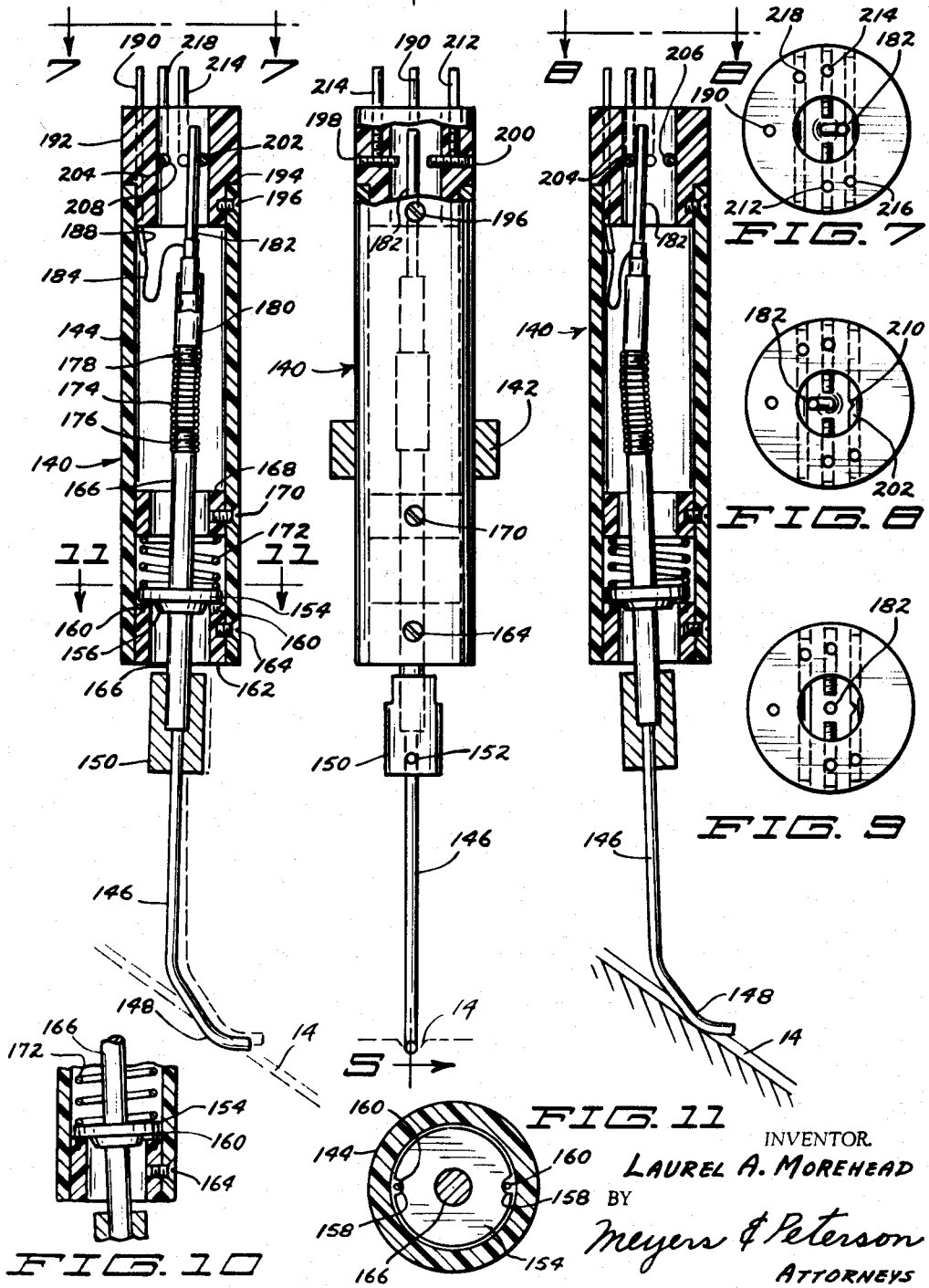
INVENTOR.
LAUREL A. MOREHEAD
BY
Meyers & Peterson
ATTORNEYS

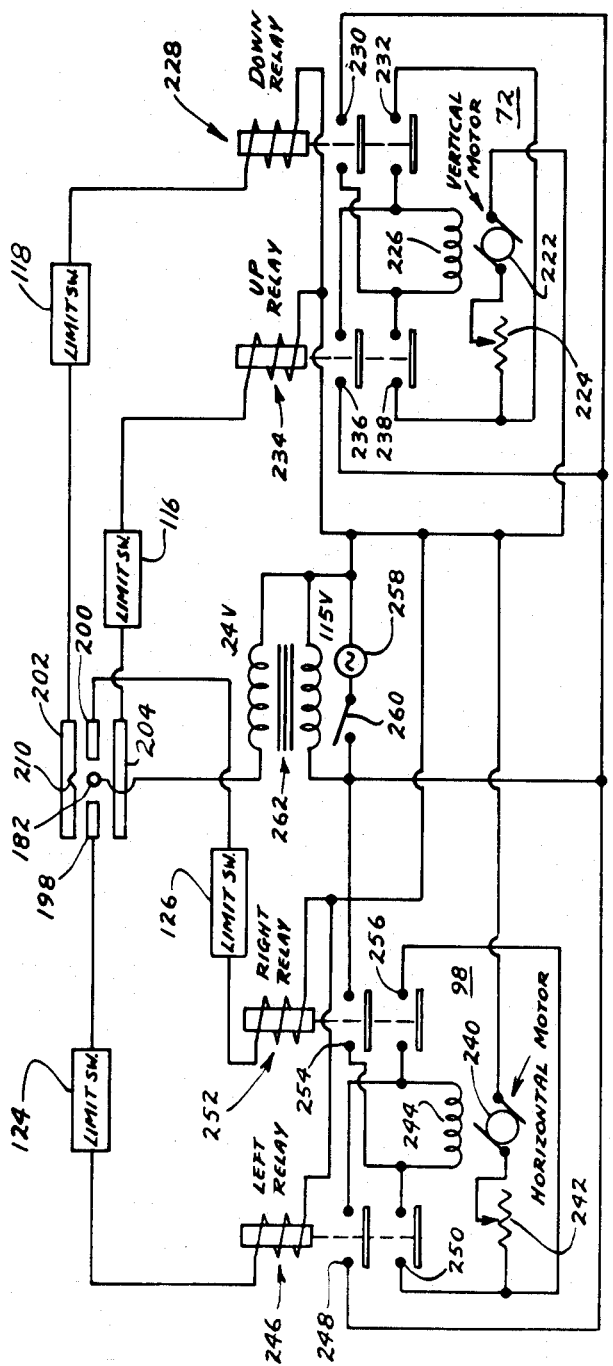

United States Patent Office 3,171,012
Patented Feb. 23, 1965

3,171,012
AUTOMATIC GROOVE FOLLOWER FOR
WELDING APPARATUS
Laurel A. Morehead, 1847 Beckman Ave., St. Paul, Minn.
Filed Mar. 26, 1962, Ser. No. 182,241
13 Claims. (Cl. 219—124)

This invention relates generally to welding apparatus for forming a seam along one edge of two workpieces to be joined, such as when making groove welds, and pertains more particularly to an automatic follower for maintaining alignment of the welding head with the two edges or sides of the groove as the weld metal is being deposited.

One object of the invention is to provide an automatic follower for welding apparatus in which the groove between two workpieces to be welded together or one edge of two pieces serves as the means for guiding a wire or rod, deflections of this wire or rod being instrumental in producing the requisite adjustment of the welding head so that the weld metal is always deposited within the groove or along the edge. The invention has for an aim the avoidance of any manual adjustment of the welding head relative to the groove or edge, as has been customary in the past.

Another object of the invention is to provide an automatic follower for welding apparatus which will cause an accurate deposition of the weld metal without the need for specially designed and contoured templates or patterns. More specifically, the present invention provides for the continued positioning of the welding head relative to the groove that is to receive the weld metal in accordance with the specific direction in which the groove extends. It will be appreciated that the invention provides for the welding of workpieces having a groove therebetween which groove may deviate from a straight course due to the shape of the workpieces, due to misalignment where massive beams are to be welded, or by reason of distortion that might take place during the actual welding procedure, these being only a few of a number of factors that require that the welding head be adjusted during the welding procedure.

A further object of the invention is to provide a follower for welding apparatus that will adjust the welding head both transversely and vertically relative to the groove, thereby assuring that the feeler will at all times remain in the groove.

Another object is to provide a follower that will assure an initial movement of the welding head toward the work groove prior to effecting any lateral or transverse adjustment of the head.

Yet another object of the invention is to provide a sensitive follower that will be inexpensive to manufacture, simple in construction, reliable and quite rugged, thereby requiring little or no maintenance.

Another object of the invention is to provide an automatic follower that can be used with various types of welding equipment. More specifically, it is an aim of the invention to provide a follower that can be readily attached to existing welding apparatus made by different manufacturers and which apparatus can be of different types.

These and other objects and advantages of my invention will more fully appear from the following description, made in connection with the accompanying drawings, wherein like reference characters refer to the same or similar parts throughout the several views and in which:

FIGURE 2 is an enlarged detail view taken in the direction of line 2—2 of FIGURE 1 for the purpose of showing the manner in which the welding head is adjusted or positioned transversely with respect to the groove receiving the weld metal in FIGURE 1;

FIGURE 3 is a view taken in the direction of line 3—3 of FIGURE 1 for the purpose of showing the vertical adjustment of the welding head that is possible when employing a follower constructed in accordance with the teachings of the present invention;

FIGURE 4 is a front elevational view of the follower mechanism itself, the view being taken in the direction of line 4—4 of FIGURE 1 with a portion of the tubular casing being broken away so as to show to better advantage certain electrical contacts that are utilized in obtaining a transverse movement of the welding head;

FIGURE 5 is a longitudinal sectional view taken in the direction of line 5—5 of FIGURE 4 but with the feeler rod or wire being biased into one extreme position, the solid line position of the feeler being such as to call for a lowering of the welding head and the phantom position thereof signifying a proper vertical position of the welding head;

FIGURE 6 is a view corresponding to FIGURE 5 but illustrating the feeler in a deflected condition calling for a raising of the welding head;

FIGURE 7 is an end view of the follower taken in the direction of line 7—7 of FIGURE 5;

FIGURE 8 is another end view of the follower but with the view being taken in the direction of line 8—8 of FIGURE 6;

FIGURE 9 is an end view of FIGURE 4 with the view turned through 90 degrees so as to correspond angularly to FIGURES 7 and 8, the feeler as indicated in this instance being properly positioned so as to require no adjustment of the welding head;

FIGURE 10 is a fragmentary sectional view of a portion of the follower mechanism in the condition it appears in FIGURE 4 and the phantom position in which it appears in FIGURE 5, the view actually illustrating a position of the feeler rod intermediate the solid line positions depicted in FIGURES 5 and 6.

FIGURE 11 is a sectional view taken in the direction of line 11—11 of FIGURE 5 showing the means for angularly orienting the feeler rod with respect to the tubular casing; and FIGURE 12 is a schematic diagram showing a circuit arrangement that can be employed in the controlling of the two motors utilized in effecting the welding head adjustment.

Figure 1:
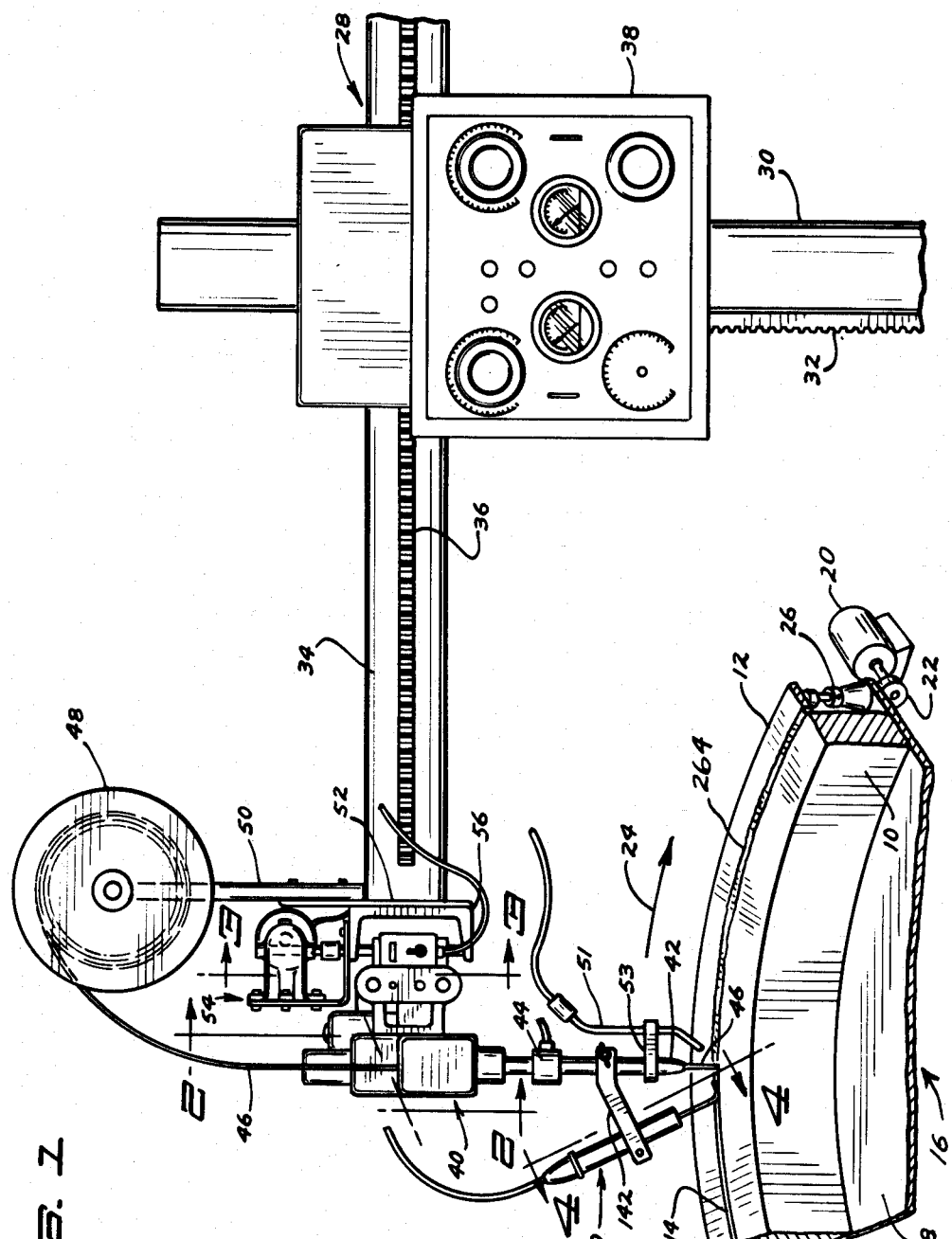
FIGURE 1 is a side elevational view of one type of welding apparatus with which my invention will find utility, the work in this instance being of arcuate configuration and shown in perspective.

Referring now in detail to FIGURE 1, the work that has been selected for the purpose of illustrating the invention includes a circular rim 10 and a flange 12 that is to be welded thereto. As is conventional in producing welds of the envisaged type, the groove 14 is formed between the two workpieces 11, 12 by chamfering or beveling the edges that are to be bonded together. In other words, as will presently be made manifest, the weld metal is to be deposited in the groove 14 in effecting the joining together of the rim 10 and the flange 12.

Owing to the configuration of the particular work that has been selected, a work support 16 is provided, this work support comprising a turntable 18, a motor 20 and a roller 22 driven by the motor and bearing against the underside of the turntable 18. While this is a rather diagrammatic driving arrangement, nonetheless, it will be appreciated that the turntable 18 is moved about a center pivot point in the direction of the arrow 24. Inasmuch as a circular flange has been shown as the member to be welded to the rim 10, a plurality of flange jacks, such as the one pictured at 26, can be employed for properly supporting the flange 12 in the proper relationship with the rim 10 during the welding operation; other clamps and fixtures can equally well be utilized, for FIGURE 1 is only intended to show the work support 16 quite generally and as simply as possible. In this regard, it will understood that the work support will be constructed in different ways, depending largely upon the type of work to be welded. For instance, if two straight beams are to be welded together, then the work support would be moved in a rectilinear direction rather than the curvilinear one that is shown. Also, as the description progresses, it will be seen that the welding head yet to be described can be advanced along the groove 14 while the work remains stationary. In this regard, it is quite conventional to either advance the welding head or advance the work, it only being necessary that there be a relative movement between the welding head and the work.

Still referring to FIGURE 1, the welding apparatus that has been selected for illustrating the invention includes a welding head manipulator denoted generally by the reference numeral 28. This manipulator 28 comprises a vertical mast or column 30 having a longitudinal gear rack 32 at one side. The manipulator 28 further includes a horizontal boom 34 having a gear rack 36 disposed along one side thereof. For the sake of simplicity, the vertical lift motor and its pinion that engages the rack 32 have not been depicted. Likewise, the horizontal traverse motor for moving the boom 34 via the rack 36 has not been shown. Actually, in the illustrative situation, these undisclosed motors would only be used in initially adjusting the welding head relative to the work 10, 12; this will be readily understood from the operational description yet to be given.

A conventional control panel 38 has been depicted in conjunction with the vertical column 30, although in actual practice, this control panel would be located in a more proximal relationship with the welding head. It will be understood that the panel 38 will be comprised of various switches, an ammeter, a voltmeter, various relays, and rheostats utilized in controlling the welding operation.

A welding head is also included in the apparatus appearing in FIGURE 1, this welding head having been generally designated by the reference numeral 40. The head includes an electrode nozzle tip 42 and a welding current lead clamp 44 via which welding current is supplied to uncoated welding wire 46 as it is forced downwardly by a wire feed motor (not shown). It will be understood by those familiar with the arc welding art that this type of welding is quite common, the wire forming the arc and the metal from the wire being constantly deposited in the groove 14 due to the heat generated by the arc. The welding current, of course, is delivered to the nozzle tip 42 through the agency of the clamp 44, the current passing through the wire, the arc that is formed, and the work 10, 12 which is connected in circuit with the welding current supply. The speed at which the welding wire 46 is fed depends upon the particular welding operation, and in this regard, it can be stated that the control panel 38 would have an appropriate rheostat for controlling the rate of wire feed. A reel 48 located atop a standard 50 serves as the source of supply for the welding wire, the undisclosed motor merely pulling the wire from the reel 48 as it is consumed by the arc when depositing weld metal in the groove 14. A mounting plate 52 functions as the medium for supporting the standard 50 at the free end of the horizontal boom 34.

Assuming that the arc welding is to be performed in an inert atmosphere, a shielding gas would be sufficient. Therefore, a gas delivery tube 51 has been shown and may be considered to be connected to a source of $CO_2$ or other inert gas. The gas delivery tube 51 is held in place by means of a bracket 53. Other types of welding may be utilized, however.

At this time, the head adjusting mechanism will be described, this mechanism having been generally denoted by the reference numeral 54. Attention is called to the details shown in FIGURE 3 and from this particular figure, it will be discerned that the head adjusting mechanism 54 includes a first channel member 56 having a web 58 which is secured to the free end of the horizontal boom 34 through the agency of the previously mentioned mounting plate 52 (FIGURE 1). The channel 56 also includes a pair of horizontal flanges 60, 62 at the top and lower edges of the web 58 to which the ends of a pair of vertically disposed guide rods 64 are anchored. It will also be noted that the flanges 60, 62 journal a threaded shaft 66. The threaded shaft 66 projects upwardly beyond the flange 60 and attached thereto is a coupling 68 which mechanically connects the shaft 66 to a gear box 70. The gear box 70 contains gears therein which are driven by a motor 72. The gear box 70 is supported by a bracket 74 secured to the flange 60.

Continuing with the description of the head adjusting mechanism 54, this mechanism additionally includes a second channel member 76 having a vertically disposed web 78 and vertical flanges 80, 82 extending along the side edges thereof. While this channel 76 appears in both FIGURES 2 and 3, the latter figure more aptly shows the presence of upper and lower integral sleeve bearings 84, 86, respectively, which slidably encircle the guide rods 64. From FIGURE 2, it can be seen that a pair of horizontally disposed guide rods 90 have their ends fixedly anchored to the flanges 80, 82. Also, from FIGURE 2, it will be appreciated that a horizontally directed threaded shaft 92 is journaled for rotation by the flanges 80, 82. A coupling 94 connects the left end of the shaft 92 of FIGURE 2 to a gear box 96 which has the gears contained therein driven by a motor 98. The gear box 96 is affixed to a bracket 100 which is, in turn, fastened to the left flange 80 of the channel 76.

Next to be referred to is a head support plate 102 having a pair of integral sleeves 104 adjacent the upper edge thereof which encircle the upper horizontal guide rod 90 and a similar pair of integral lower sleeves 106 which freely encircle the lower horizontal rod 90. A threaded sleeve 108 is also integral with the plate 102, this sleeve being in engagement with the threaded shaft 92. These elements 106, 108 may constitute a single block as illustrated in FIGURE 2. As its name indicates, the head support plate 102 functions to support the welding head 40 which has been previously mentioned.

From what has been herein said, it will be understood that the motor 72 which operates the threaded shaft 66 functions to raise and lower the welding head 40, since the second channel 76 is raised or lowered, depending upon the direction of rotation of the motor 72. This vertical movement is in the direction of the arrows labeled 107. Since the head support plate 102 is slidably disposed on the horizontal guide rods 90 anchored to the vertical flanges 80, 82 of the channel 76, it follows that the welding head 40 is moved vertically in the direction of the arrows 107.

Similarly, the motor 98 functions to rotate the threaded shaft 92, and due to the presence of the threaded sleeve 108 on the head support plate 102, it follows that the motor 92 causes the head support plate 102 to be moved to the right or left as the case may be in accordance with the direction of rotation of this particular motor. This movement is indicated by the arrows 109 of FIGURE 2.

Accordingly, it should be evident that the welding head 40 can be moved both vertically and horizontally. Hereinafter, the manner in which the vertical motor 72 and the horizontal motor 98 are energized will be explained. At this point, though, attention is first directed to a limit switch housing 110 having a cable 112 extending from certain relays yet to be described. This same switch housing 110 also accommodates a plug-in cable 114 leading to the follower that will be presently referred to. For the purpose of assuring that the welding head 40 will not move too far upwardly, an upper limit switch 116 is employed. Likewise, a lower limit switch 118 is utilized. Between these limit switches 116, 118 is a resilient switch arm 120 which is engaged by a U-shaped actuating member 122 mounted on the horizontal flange of the channel 56. Inasmuch as the limit switch housing 110 is supported on the left vertical flange 84 of the channel 76, sufficient relative movement between the channels 54 and 76 will cause an operation of either of the limit switches 116 or 118. These limit switches are also shown in FIGURE 12.

In order to prevent too much horizontal movement of the welding head 40, a left limit switch 124 has been pictured, as well as a right limit switch 126. As with the limit switches 116 and 118, a resilient arm 128 is interposed between these switches 124, 126. The resilient arm 128 is moved in either direction by a shiftable actuating rod 132, which is slidably carried by the vertical flanges 80, 82 of the channel 76. From FIGURE 2, it can be seen that a pair of spaced stops 134, 136 are carried on the shiftable actuating rod 132. By reason of a lug 138 affixed to the head support plate 102 one or the other of these stops 134, 136 will be engaged should there be too great a transverse movement of the welding head 40. Here again, these limit switches 124, 126 are pictured in FIGURE 12.

As can be seen from FIGURE 1, a follower assembly indicated generally by the reference numeral 140 is held in a fixed relationship with respect to the welding head 40 by virtue of a bracket 142. In order to sense as accurately as possible the deviations that will be experienced with respect to the groove 14, the follower assembly 140 should be mounted quite close to the point at which the welding wire 46 is projected from the nozzle tip 42. In other words, the follower 140 should be spaced quite close to the welding puddle, yet spaced sufficiently far therefrom so as not to be subjected to objectionable spattering. A spacing of three inches has been found satisfactory for the exemplary shielded arc welding process that has been shown.

The actual construction of the follower assembly 140 can be better understood by referring to FIGURES 4–11. From these views, it will be noted that the assembly includes a tubular casing 144 of electrical insulating material, a suitable plastic being appropriate. The assembly 140 also comprises a feeler rod or wire 146 having a curved lower end 148 so as to ride in the confines of the groove 14 and to bear firmly against the sides thereof. As will become apparent, the feeler rod or wire 146 senses lateral and vertical deviations between the groove 14 and the welding head 140, and causes the motors 72 and 98 to make the proper corrections in the position of the welding head 40 with respect to the groove. In other words, it is the office of the feeler 146 to maintain an accurate alignment of the welding head 40 with respect to the groove 14 in which weld metal is being deposited.

The upper end of the feeler rod or wire 146 is retained in a chuck or coupler 150 by means of a set screw 152 (FIGURE 4). Playing an important role in the transmission of the deflecting forces imposed upon the feeler 146 is an annular wobble plate or flange 154 having a rounded or convex surface 156 on its underside for centering purposes. The plate or flange 154 is formed with diametrically located notches 158 for the purpose of retaining the plate or flange 154 angularly oriented within the tubular casing 144. Stated somewhat differently, the notches 158 have received therein a pair of pins 160, these pins being carried on a retaining ring 162 having an internal bore of a size adequate to accommodate the rounded or convex surface 156. As best seen from FIGURES 5 and 6, the retaining ring 162 is held fast within the lower end of the tubular casing 144 by a set screw 164.

Although it is difficult to show physically the angular relationship of the wobble plate or flange 154 with respect to the rod 166 on which it is supported or carried, nonetheless, it should be noted that the plane of the plate or flange 154 is tilted at an angle of approximately three degrees with respect to the longitudinal axis of the support rod 166, as close inspection of FIGURES 5, 6, and 10 will reveal. This angular relationship is quite important in rendering the follower 140 sensitive to slight deviations in the groove 14 from a true course or path. More will be said presently concerning this angularity.

Longitudinally inset from the retaining ring 162 is a second retaining ring 168 held in place by a set screw 170. The purpose of the ring 168 is to hold a coil spring 172 in a manner such that one end will bear against the plate or flange 154 and thus hold or bias the plate or flange 154 against the retaining ring 162 which acts as a seat therefor.

A second coil spring 174, which is of relatively small diameter, has its lower end in threaded engagement with a tip 176 formed on the upper end of the support rod 176 and has its upper end received similarly on a tip 178 formed on the lower end of a sleeve 180. In this way, a contact rod 182, which is pressfitted or otherwise secured in the upper end of the sleeve 180, is rendered yieldable. A pig tail or braided conductor 184 electrically connects the contact rod 182 to the lower end of a terminal rod 188 forming a prong 190 at its upper extremity. The terminal rod 188 extends through an insulating bushing 192 having a shoulder at 194 which bears against the upper end of the tubular casing 144. The bushing 192 is held in place with respect to the casing 144 by a set screw 196.

While the rod 182, which is movable when the feeler 146 is deflected, serves as one electrical contact, the follower assembly 140 includes four additional contacts which are quadrantly spaced with respect to each other and any one of which can be engaged by the contact rod 182 when it has been moved sufficiently by enough deflection of the feeler 146. These contacts may be considered as being left and right contacts 198, 200 and these particular two contacts constitute threaded metallic rod elements received in the insulating bushing 192. As can be seen from FIGURE 4, either one of the contacts 198 or 200 can be advanced or retracted with respect to the contact rod 182. The other two contacts can be termed down and up contacts, these being labeled 202 and 204, respectively. Like the left and right contacts 198 and 200, the rod contacts 202, 204 are threadedly received in the bushing 192 but are on parallel axes of rotation offset from the common axis of the contacts 198, 200. It is planned that the contacts 202 and 204 be flattened at 206 and 208, respectively, so that they, too, are susceptible of adjustment. It will be understood that twisting these contacts about their longitudinal axes will vary or modify the normal spacing existing between these contacts and the contact rod 182. The down contact 202 is formed with a central notch 210 which resists any lateral shifting of the contact rod 182 when it is engaging this contact 202. It has been found in actual practice that any lateral adjustment of the welding head 40 should be postponed until the welding head has been lowered sufficiently to cause engagement of the feeler rod 146 with the groove 140, thereby avoiding any unnecessary transverse head adjustment or hunting movement that might be caused by the contact rod 182 seeking an incorrect engagement with either the contact 198 or 200 due to sliding along the contact 202 if no notch were provided. Another important advantage of the notch 210 lies in the ease with which the proper contact spacing can be realized. All that is necessary in this regard is that the notch 210 be brought into juxtaposition with the rod contact 182 when at its natural center. Then the left and right contacts 198 and 200 can be advanced or retracted so as to provide a natural contact spacing of approximately 0.005 inch or so, depending on the specific operating requirements.

Whereas, the contact rod 182 is an electrical communication with the prong 190, the contacts 198–204 are connected directly to additional prongs 212, 214, 216, and 218, respectively. The cable 114 has already been alluded to, and, at this time, attention is called to the fact that the cable 114 is equipped with a receptical 220 having tubular terminals contained therein which are designed to telescopically accept the various prongs 190, 212, 214, 216, and 218, so that the follower assembly 140 can be electrically connected to the switch housing 110. Actually, reference should be made to FIGURE 12 for a better comprehension of the connections that are to be effected with the follower assembly 140.

While various wiring arrangements can be utilized in the practicing of the present invention, one circuit that can be employed has been set forth in FIGURE 12. The motor for moving the welding head 40 vertically has been previously assigned the reference numeral 72. From FIGURE 12, it can be seen that this motor has an armature 122 and that a rheostat 224 is connected in series therewith. Also, it is intended that a field winding 226 be employed and that the flow of current through the armature 222 and field winding 226 be reversed in direction in order to reverse the rotation of the motor 72. Consequently, when the follower assembly calls for movement of the welding head 140 downwardly, this being dictated by the engagement of the contact rod 182 with the contact 202 and more specifically in the notch 210 of the contact 202, then a relay denoted generally by the reference numeral 228 will be energized through the previously referred to limit switch 116. The relay 228 is equipped with two sets of contacts 230 and 232, which, when closed, function to cause energization of the motor 72 in a manner such that it will move the welding head 140 upwardly.

Whereas the relay 228 initiates a downward movement of the welding head 140, a second relay 234 is intended to cause an upward movement of the welding head. The relay 234 is provided with two sets of contacts 234 and 238 which, when closed, cause a reversal of current through the field winding 226 with respect to the armature 222 from that which took place when the relay 228 was picked up or energized. The rheostat 224, it will be appreciated, is adjustable so as to determine the speed at which the vertical motor 72 operates.

As with the motor 72, the horizontal motor 98 includes an armature 240 having in circuit therewith a rheostat 242 by which its speed can be predetermined. This motor 98 also has a field winding, the field winding having the reference numeral 244 associated therewith. When the feeler 146 calls for a left movement, a relay 246 wil be energized so as to close its two sets of contacts 248 and 250, which action causes the motor 98 to rotate in one direction. On the other hand, a relay 252 is responsible for effecting a reverse rotation of the motor 98 and does so via its two sets of contacts 254 and 256. Whereas the relays 228 and 234 are selectively energized by reason of the contact rod 182 engaging either the contact 202 or 204, the relays 246 and 252 are selectively energized through the medium of the contacts 198 and 200.

The power source for operating the motors 72 and 98, as well as the various relays that have been mentioned, can depend upon a variety of circumstances. In the present instance, it may be assumed that an alternating current source of potential labeled 258 is provided and that a disconnect switch 260 is in circuit therewith. Hence, when the switch 260 is closed, assuming that the source 258 is a 115 volt source, power will be supplied to either of the motors 72 or 98 when the appropriate contacts are closed. Inasmuch as the relays 228, 234, 246, and 252 can be appropriately energized with a lower potential, a stepdown transformer 262 has been pictured, the transformer 262 reducing the 115 volt potential to a 24 volt value.

Having presented the foregoing information, the manner in which my invention operates should be readily understood. In preparing the follower assembly 140 for proper functioning, though, attention is now directed once again to the slant or tilt of the wobble plate or flange 154 with respect to the longitudinal axis of the support rod 166 on which the wobble plate or flange is fixedly mounted. This relationship is perhaps best appreciated from an inspection of FIGURE 5. Close study of the wobble plate or flange 154 will demonstrate that this element is squarely seated in this view against the retaining ring 162, which is designed to act as a support for this particular element. Although the wobble plate or flange 154 is squarely seated about its periphery, nonetheless, it will be perceived that the support rod 166 on which the member 154 is mounted is at an angle with respect to the true vertical, thereby urging the contact rod 182 into engagement with the contact 202. The relationship pictured in FIGURE 5 would be the relationship that the feeler 146 would assume without any restraint imposed thereon by the workpieces 10, 12.

It is when no deflective forces from the groove 14 are present that the notch 210 should be aligned with the contact rod 182. With this adjustment effected, the side contacts 198 and 200 are moved to provide a spacing to either side of the contact rod 182 of about 0.005 inch.

During the initial lowering of the feeler rod 146 toward the groove 14, the notch 210 prevents any tendency for the contact rod 182 to move laterally into engagement with either of the contacts 198, 200, thereby postponing any energization of the horizontal motor 98 until such time that the feeler rod 146 can actually sense the transverse misalignment of the welding head 40 with respect to the groove 14. During normal operation, the feeler 146 would be urged into the dotted or phantom line position shown in FIGURE 5, this causing the contact rod 182 to be moved away from the contact 202. Hence, the initial relationship will be with the wobble plate or flange 154 fully seated as shown in FIGURE 5, but when the follower assembly 140 is lowered toward the groove 14 to such an extent that the feeler 146 is deflected upwardly so as to disengage the contact rod 182 from the contact 202, the wobble plate or flange 154 will be fulcrumed with respect to the retaining ring 162 to the extent shown in FIGURE 10. From FIGURE 10, it will be appreciated that only one small segment of the wobble plate or flange 154 will normally bear on the retaining ring 162. Hence, owing to this fulcruming, the support rod 166 can be readily deflected in any direction without the resistance that would be otherwise introduced if the deflection of the wobble plate had to take place from a fully seated relationship with the retaining ring 162, this fully seated relationship appearing in FIGURE 5 as already explained.

Assuming that the wobble plate or flange 154 is in its normal position as indicated in FIGURE 10, then the contact rod 182 will be centrally located between the contacts 202 and 204. If the welding head 40 is aligned with the groove 14, then the contact rod 182 will also be centrally disposed between the contacts 198 and 200 as well (see FIGURE 9). Consequently, none of the relays 228, 234, 246, or 252 will be energized. Consequently, with the turntable motor 20 rotating the turntable 18, the work composed of the rim 10 and the flange 12 will merely be moved in the direction of the arrow 24, and the head 40 will thereby be relatively advanced with respect to the work to deposit weld metal in the groove 14, the resulting bead carrying the reference numeral 264 (FIGURE 1).

However, practice has shown that a groove such as the groove 14 will not follow a true course or path. This is due to a number of reasons, one being that the workpieces, whatever they may constitute, are not accurately contoured so as to fit together and therefore the groove will meander somewhat laterally and will frequently vary up and down. Sometimes the heat from the arc or other welding heads will cause sufficient distortion in the work so that an adjustment must be made in order to locate the welding head centrally above the groove. In a number of instances the groove will follow an arcuate path that would not be part of a circle, and constant adjustment of the welding head would be necessary in such an instance. Even when welding two straight beams together, it is difficult to mount such beams so that the welding head will traverse a path coincident with the groove. Other variables enter into the picture, too, and these various factors have been previously taken into account and compensated for by manually adjusting the position of the welding head as circumstances dictate.

Should the groove deviate from a circular path, the illustrative situation calling for a circular welding seam to be laid in the groove 14, it will be understood that the feeler rod or wire 146 will be deflected. This is so by reason of the engagement of the feeler 146 with the sides of the groove. For instance, should the groove 14 deviate in such a direction from a true course that the feeler 146 is deflected to the right as viewed in FIGURE 4, then it follows that the contact rod 182 will be moved to the left and sufficient leftward movement will cause engagement thereof with the contact 198. This completes a circuit through the relay 246 with the consequence that the relay is energized to close its contacts 248, 250. Closure of these contacts will cause the horizontal motor 98 to shift the welding head 40 transversely to the left when viewing the welding head 40 from the right in FIGURE 1, that is, when looking in a direction opposite to the arrow 24. By the same token, should the feeler 146 be deflected to the right by the groove 14, then the contact rod 182 will move into engagement with the contact 200 to cause the relay 252 to be picked up with the consequence that the motor 98 will rotate in an opposite direction to correct this particular latent misalignment of the head 40 relative to the groove.

If the workpieces 10, 12, and the groove 14 should move upwardly toward the head 40 or vice versa, then it follows that the feeler 146 will cause the contact rod 182 to engage the contact 204 to energize the relay 234 and thereby operate the motor 72 to raise the welding head 40. On the other hand, if the spacing between the head 40 and the groove tends to become too great, then the pressure exerted against the curved end of the feeler rod 146 will be lessened and the spring 172, which constantly acts in a direction to seat the wobble plate 154, will permit the contact rod 182 to assume the position illustrated in FIGURE 5. The completion of an electrical circuit through the contacts 182, 202 will energize the relay 228 to move the welding head downwardly toward the work.

Therefore, once the feeler rod 146 has engaged the groove 14, it will always follow this groove because of the ability of the wobble plate or flange 154 to fulcrum or pivot in any direction dictated by the path of the groove 14 and the particular position of the welding head 40 with respect thereto. Even if foreign matter within the groove 14 or some obstacle cause an erratic deflection of the feeler rod 146, no damage to the welding apparatus will occur because of the control constantly exercised by the limit switches 116, 118, 124, and 126, as the appropriate one of these switches will be opened to immediately de-energize the then energized relays 228, 234, 246, and 252, as the case may be.

Although it has already been herein mentioned, it must be borne in mind that the welding apparatus selected to exemplify my invention has been selected with the throught of pictorially presenting the operation of my follower mechanism or assembly 140 as simply as possible in conjunction with the resulting control functions that are to be performed in depositing the bead or weld metal 264 in a groove that might follow a variety of different paths.

It will, of course, be understood that various changes may be made in the form, details, arrangements, and proportions of the parts without departing from the scope of my invention as set forth in the appended claims.

What is claimed:
1. In apparatus for welding work having a groove formed by the pieces to be joined together:
 (a) a welding head for depositing weld metal in said groove;
 (b) means for relatively advancing said work and welding head in a direction generally lengthwise with respect to said groove;
 (c) first motor means for adjusting the position of said welding head transversely with respect to said groove;
 (d) second motor means for adjusting the position of said welding head toward and away from said groove;
 (e) a follower assembly fixedly mounted on said apparatus and spaced forwardly of the welding head, said follower assembly including:
 (f) elongated feeler means having one end thereof adapted to slidably engage said groove and its other end providing an electrical contact;
 (g) means fulcruming said feeler means intermediate its ends so that said electrical contact is moved in accordance with the direction in which said one end is deflected;
 (h) a plurality of angularly spaced electrical contacts engageable by said first contact; and
 (i) respective circuit means associated with said first contact and each of said plurality of contacts for energizing said first and second motor means to maintain said welding head in alignment with said groove.

2. Welding apparatus in accordance with claim 1 in which said fulcruming means includes:
 (a) an annular wobble plate fixedly connected to said one end of the feeler means; and
 (b) a fixed ring member having a circular edge against which said wobble plate bears.

3. In combination with apparatus which includes a welding head and means for moving the welding head transversely of, as well as toward and away from, a groove located on work to be welded, a follower assembly comprising:
 (a) an elongated casing;
 (b) a feeler rod having one end adapted to ride in said groove;
 (c) means adjacent one end of said casing for fulcruming said feeler rod;
 (d) a contact adjacent the other end of said casing and movable sideways within said casing when said feeler rod is deflected by the sides of said groove and movable at right angles to said sidewise movement when said rod is either deflected upwardly or permitted to move downwardly by said groove;
 (e) a first pair of laterally spaced rod contacts mounted adjacent the other end of said casing and having their ends disposed for individual engagement by said first-mentioned contact when said feeler rod is deflected sufficiently by the sides of said groove, engagement of said first-mentioned contact with one of said first pair of contacts denoting the need for adjusting said welding head in one sidewise direction and engagement of said first-mentioned contact with the other at said first pair of contacts denoting the need for adjustment in the opposite sidewise direction; and
 (f) a second pair of spaced rod contacts mounted adjacent said other end of the casing in a vertical offset relation with respect to the axis of said first pair of contacts, said second pair of contacts having their sides disposed for individual engagement by said first-mentioned contact when said feeler rod is deflected sufficiently upward by said groove or is permitted to move sufficiently downwardly, engagement of said first-mentioned contact with one of said second pair of contacts denoting the need for adjusting said welding head in one vertical direction and engagement of said first-mentioned contact with the other of said second pair of contacts the need for adjustment in the opposite vertical direction.

4. In apparatus for welding work having a groove formed by the pieces to be joined together:
 (a) a welding head for depositing weld metal in said groove;
 (b) means for relatively advancing said work and welding head in a direction generally longitudinally with respect to said groove;
 (c) motor means for adjusting the position of said welding head transversely with respect to said groove;
 (d) a deflectable follower rod carried by said welding head and projecting into said groove forwardly of said welding head;
 (e) first and second switch means disposed to either side of said follower rod,
 (f) said first switch means being actuated by said follower rod when deflected in one direction by one side of said groove and the second switch means being actuated by said follower rod when deflected in an opposite direction by the other side of said groove;
 (g) circuit means connected to said switch means and said motor means for causing said motor means to move said welding head toward said other side of the groove when said first switch means is actuated and toward said one side of the groove when said second switch means is actuated;
 (h) second motor means for adjusting the position of said welding head in a direction toward and away from said work;
 (i) third and fourth switch means disposed in a 90 degree relation with respect to said first and second switch means,
 (j) said third switch means being actuated by said follower rod when the distance decreases between said welding head and said groove to increase the force applied to said follower rod,
 (k) said fourth switch means being actuated by said follower rod when the distance increases between said welding head and said groove to decrease the force applied to said follower rod, and
 (l) circuit means connected to said third and fourth switch means and said second motor means for causing said second motor means to move said welding head in a direction away from said work when said third switch means is actuated and in a direction toward said work when said fourth switch means is actuated.

5. In apparatus for welding work having a groove formed by the pieces to be joined together:
 (a) a welding head for depositing weld metal in said groove;
 (b) means for relatively advancing said work and welding head in a direction generally lengthwise with respect to said groove;
 (c) first motor means for adjusting the position of said welding head transversely with respect to said groove;
 (d) second motor means for adjusting the position of said welding head toward and away from said groove;
 (e) a follower assembly fixedly mounted on said apparatus and spaced forwardly of the welding head, said follower assembly including:
 (f) elongated feeler means having one end thereof adapted to slidably engage said groove and its other end providing an electrical contact;
 (g) means fulcruming said feeler means intermediate its ends so that said electrical contact is moved in accordance with the direction in which said one end is deflected,
 (h) said fulcruming means including an annular wobble plate fixedly connected to said one end of the feeler means, and a fixed ring member having a circular edge against which said wobble plate bears, said wobble plate residing in a plane tilted with respect to the longitudinal axis of said feeler means and to the longitudinal axis of said ring member, whereby during normal operation of said apparatus said wobble will engage said ring member at one angular location so as to be readily rocked at said one angular location;
 (i) a plurality of angularly spaced electrical contacts engageable by said first contact, and
 (j) respective circuit means associated with said first contact and each of said plurality of contacts for energizing said first and second motor means to maintain said welding head in alignment with said groove.

6. Welding apparatus in accordance with claim 5 including:
 (a) spring means urging said wobble plate against said ring member;
 (b) the pressure with which said one end of the feeler means normally bears against said groove overcoming the action of said spring means to cause said engagement of the wobble plate with said ring member at said one angular location.

7. In combination with apparatus which includes a welding head and means for moving the welding head transversely of, as well as toward and away from, a groove located on work to be located on work to be welded, a follower assembly comprising:
 (a) an elongated casing;
 (b) a feeler rod having one end adapted to ride in said groove;
 (c) means adjacent one end of said casing for fulcruming said feeler rod;
 (d) a contact adjacent the other end of said casing and movable sideways within said casing when said feeler rod is deflected by the sides of said groove and movable at right angles to said sidewise movement when said rod is either deflected upwardly or permitted to move downwardly by said groove;
 (e) a first pair of laterally spaced rod contacts mounted adjacent the other end of said casing and having their ends disposed for individual engagement by said first-mentioned contact when said feeler rod is deflected sufficiently by the sides of said groove, engagement of said first-mentioned contact with one of said first pair of contacts denoting the need for adjusting said welding head in one sidewise direction and engagement of said first-mentioned contact with the other at said first pair of contacts denoting the need for adjustment in the opposite sidewise direction;
 (f) a second pair of spaced rod contacts mounted adjacent said other end of the casing in a vertical offset relation with respect to the axis of said first pair of contacts, said second pair of contacts having their sides disposed for individual engagement by said first-mentioned contact when said feeler rod is deflected sufficiently upward by said groove or is permitted to move sufficiently downwardly, engagement of said first-mentioned contact with one of said second pair of contacts denoting the need for adjusting said welding head in one vertical direction and engagement of said first-mentioned contact with the other of said second pair of contacts the need for adjustment in the opposite vertical direction,
 (g) said first pair of contacts being threadedly mounted in said casing for adjustment relative to said first-mentioned contact, and
 (h) said second pair of contacts being mounted for rotation about their longitudinal axes, said second pair of contacts each having a flat side so as to move a portion of each of said second pair of contacts closer or farther from said first-mentioned contact to effect adjustment of said second pair of contacts.

8. Welding apparatus in accordance with claim 7 in which:
(a) one of said second pair of contacts is formed with a notch for restraining said first-mentioned contact from sidewise movement until the needed vertical adjustment of the welding head denoted by the engagement of said first-mentioned contact with said one of said second pair of contacts has been at least partially fulfilled.

9. In combination with apparatus which includes a welding head and means for moving the welding head transversely of, as well as toward and away from, a groove located on work to be welded, a follower assembly comprising:
(a) an elongated casing;
(b) a feeler rod having one end adapted to ride in said groove;
(c) means adjacent one end of said casing for fulcruming said feeler rod;
(d) a contact adjacent the other end of said casing and movable sideways within said casing when said feeler rod is deflected by the sides of said groove and movable at right angles to said sidewise movement when said rod is either deflected upwardly or permitted to move downwardly by said groove;
(e) a first pair of laterally spaced rod contacts mounted adjacent the other end of said casing and having their ends disposed for individual engagement by said first-mentioned contact when said feeler rod is deflected sufficiently by the sides of said groove, engagement of said first-mentioned contact with one of said first pair of contacts denoting the need for adjusting said welding head in one sidewise direction and engagement of said first-mentioned contact with the other at said first pair of contacts denoting the need for adjustment in the opposite sidewise direction;
(f) a second pair of spaced rod contacts mounted adjacent said other end of the casing in a vertical offset relation with respect to the axis of said first pair of contacts, said second pair of contacts having their sides disposed for individual engagement by said first-mentioned contact when said feeler rod is deflected sufficiently upward by said groove or is permitted to move sufficiently downwardly, engagement of said first-mentioned contact with one of said second pair of contacts denoting the need for adjusting said welding head in one vertical direction and engagement of said first-mentioned contact with the other of said second pair of contacts the need for adjustment in the opposite vertical direction,
(g) said first pair of contacts being threadedly mounted in said casing for adjustment relative to said first-mentioned contact,
(h) said second pair of contacts being mounted for rotation about their longitudinal axes, said second pair of contacts each having a flat side so as to move a portion of each of said second pair of contacts closer or farther from said first-mentioned contact to effect adjustment of said second pair of contacts,
(i) one of said second pair of contacts being formed with a notch for restraining said first-mentioned contact from sidewise movement until the needed vertical adjustment of the welding head denoted by the engagement of said first-mentioned contact with said one of said second pair of contacts has been at least partially fulfilled, said one contact of said second pair being the contact denoting that an adjustment of the welding head should be made in a direction toward the work, and (j) means for biasing said first-mentioned contact into said notch.

10. In combination with apparatus which includes a welding head and means for moving the welding head transversely of, as well as toward and away from, a groove located on work to be welded, a follower assembly comprising:
(a) an elongated casing;
(b) a feeler rod having one end adapted to ride in said groove;
(c) means adjacent one end of said casing for fulcruming said feeler rod;
(d) a contact adjacent the other end of said casing and movable sideways within said casing when said feeler rod is deflected by the sides of said groove and movable at right angles to said sidewise movement when said rod is either deflected upwardly or permitted to move downwardly by said groove;
(e) a first pair of laterally spaced rod contacts mounted adjacent the other end of said casing and having their ends disposed for individual engagement by said first-mentioned contact when said feeler rod is deflected sufficiently by the sides of said groove, engagement of said first-mentioned contact with one of said first pair of contacts denoting the need for adjusting said welding head in one sidewise direction and engagement of said first-mentioned contact with the other at said first pair of contacts denoting the need for adjustment in the opposite sidewise direction;
(f) a second pair of spaced rod contacts mounted adjacent said other end of the casing in a vertical offset relation with respect to the axis of said first pair of contacts, said second pair of contacts having their sides disposed for individual engagement by said first-mentioned contact when said feeler rod is deflected sufficiently upward by said groove or is permitted to move sufficiently downwardly, engagement of said first-mentioned contact with one of said second pair of contacts denoting the need for adjusting said welding head in one vertical direction and engagement of said first-mentioned contact with the other of said second pair of contacts the need for adjustment in the opposite direction,
(g) said first pair of contacts being threadedly mounted in said casing for adjustment relative to said first-mentioned contact,
(h) said second pair of contacts being mounted for rotation about their longitudinal axes, said second pair of contacts each having a flat side so as to move a portion of each of said second pair of contacts closer or farther from said first-mentioned contact to effect adjustment of said second pair of contacts, and
(i) one of said second pair of contacts being formed with a notch for restraining said first-mentioned contact from sidewise movement until the needed vertical adjustment of the welding head denoted by the engagement of said first-mentioned contact with said one of said second pair of contacts has been at least partially fulfilled, said one contact of said second pair being the contact denoting that an adjustment of the welding head should be made in a direction toward the work.

11. In apparatus for welding work having at least one edge formed by the pieces to be joined together:
(a) a welding head for forming a seam along said edge;
(b) means for relatively advancing said work and welding head in a direction generally lengthwise with respect to said edge;
(c) first electrically operated motor means for adjusting the position of said welding head transversely with respect to said edge;
(d) second electrically operated motor means for adjusting the position of said welding head in a direction toward and away from said work;
(e) a single follower member carried by said welding head for engaging said workpieces;
(f) means urging said follower member toward said work and against said edge;
(g) first electric contact means actuated by said follower member for controlling said first electrically operated motor means in accordance with transverse deviations of said edge with respect to said welding head, and
(h) second electric contact means actuated by said follower member for controlling said second electrically operated motor means in accordance with deviations of said work in a direction toward and away from said welding head,
(i) whereby said seam is properly formed along said edge while said welding head and work are being advanced relative to one another.

12. In combination with apparatus which includes a welding head and means for moving the welding head transversely of, as well as toward and away from, a groove located on work to be welded, a follower assembly comprising:
(a) an elongated casing;
(b) a feeler rod having one end adapted to ride in said groove;
(c) means within said casing fulcruming said feeler rod including a wobble plate fixedly mounted on the feeler rod and a ring secured within the casing against which said plate bears;
(d) a contact actuated by said feeler rod when said feeler rod is deflected from a preferred position with respect to said groove;
(e) a plurality of spaced contacts selectively engaged by said first mentioned contact in accordance with the direction in which said feeler rod is deflected; and
(f) means energized by engagement of said first mentioned contact with any one of said second mentioned contacts for causing said welding head to be moved into a preferred relationship with said groove 13. Welding apparatus in accordance with claim 12 including:
(a) a coil spring for yieldingly transmitting deflective forces from said feeler rod to said first mentioned contact.

References Cited by the Examiner

UNITED STATES PATENTS

| | | |
|---|---|---|
| 1,840,853 | 1/32 | Shaw et al. |
| 2,189,399 | 2/40 | Lewbers _____ 219—124 |
| 2,670,423 | 2/54 | Darner et al. _____ 219—124 X |
| 2,839,663 | 6/58 | McCollom _____ 219—125 |
| 3,072,779 | 1/63 | Masters et al. _____ 219—125 |

RICHARD M. WOOD, *Primary Examiner.*